US009363654B2

United States Patent
Sullivan et al.

(10) Patent No.: US 9,363,654 B2
(45) Date of Patent: Jun. 7, 2016

(54) VIRTUAL HISTORICAL DISPLAYS

(71) Applicant: AT&T Intellectual Property I, L.P., Atlanta, GA (US)

(72) Inventors: Marc Andrew Sullivan, Austin, TX (US); James H. Pratt, Round Rock, TX (US); Garrett L. Stettler, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 201 days.

(21) Appl. No.: 14/064,250

(22) Filed: Oct. 28, 2013

(65) Prior Publication Data

US 2015/0120616 A1 Apr. 30, 2015

(51) Int. Cl.
H04W 4/18 (2009.01)
G06Q 30/02 (2012.01)
H04L 29/08 (2006.01)
H04W 4/02 (2009.01)
G06T 19/00 (2011.01)

(52) U.S. Cl.
CPC .............. *H04W 4/18* (2013.01); *G06Q 30/0205* (2013.01); *H04L 67/22* (2013.01); *H04W 4/028* (2013.01); *G06T 19/006* (2013.01)

(58) Field of Classification Search
None
See application file for complete search history.

(56) References Cited

U.S. PATENT DOCUMENTS

| 6,954,148 | B2 | 10/2005 | Pulkkinen et al. |
| 7,804,416 | B2 | 9/2010 | Wu et al. |
| 8,103,477 | B2 | 1/2012 | Graichen et al. |
| 8,239,277 | B2 | 8/2012 | Lee et al. |
| 2006/0010028 | A1* | 1/2006 | Sorensen ............... G06Q 30/02 705/7.34 |
| 2006/0138219 | A1* | 6/2006 | Brzezniak ............... G06Q 20/32 235/383 |
| 2009/0102746 | A1* | 4/2009 | Fisher ................. A63B 24/0006 345/8 |
| 2009/0171939 | A1* | 7/2009 | Athsani ............. G06F 17/30241 |
| 2009/0182499 | A1 | 7/2009 | Bravo |
| 2009/0271251 | A1* | 10/2009 | Sorensen ............... G06Q 30/02 348/14.01 |
| 2011/0144902 | A1 | 6/2011 | Forte et al. |
| 2011/0246064 | A1 | 10/2011 | Nicholson |
| 2012/0182172 | A1 | 7/2012 | Sorensen |
| 2012/0268252 | A1 | 10/2012 | Lee et al. |

(Continued)

FOREIGN PATENT DOCUMENTS

| JP | 2001014592 | 1/2001 |
| KR | 20110005082 | 1/2011 |

(Continued)

OTHER PUBLICATIONS

Munguia, "A wearable augmented reality system to improve the quality of life of sedentary people"; Proceedings of the 3rd Mexican Workshop on Human Computer Interaction(MexIHC'2010) vol. 1.*

*Primary Examiner* — Maurice L McDowell, Jr.
(74) *Attorney, Agent, or Firm* — Hartman & Citrin LLC

(57) ABSTRACT

Concepts and technologies are disclosed herein for virtual historical displays. A server computer or other computing device can execute a virtual display service. The virtual display service can obtain behavioral data associated with a geographic location and an activity associated with a user of a user device. The virtual display service can associate the behavioral data with the user device and the geographic location, and detect subsequent activity associated with the geographic location. The virtual display service can determine that the behavioral data is to be shared with a device associated with the subsequent activity. The virtual display service can provide the behavioral data to the device.

19 Claims, 10 Drawing Sheets

(56) References Cited

U.S. PATENT DOCUMENTS

| | | |
|---|---|---|
| 2013/0063432 A1 | 3/2013 | Kaps et al. |
| 2013/0063561 A1 | 3/2013 | Stephan |
| 2013/0096817 A1* | 4/2013 | Fauci .................... H04W 4/043 701/411 |
| 2013/0132241 A1 | 5/2013 | Sorensen |
| 2014/0207962 A1* | 7/2014 | Makofsky ............... H04L 65/60 709/231 |

FOREIGN PATENT DOCUMENTS

| | | |
|---|---|---|
| WO | WO 2008/134562 | 11/2008 |
| WO | WO 2013/043345 | 3/2013 |

* cited by examiner

VIRTUAL HISTORICAL DISPLAYS

BACKGROUND

Mobile computing devices such as cell phones and/or smartphones have become an integral part of modern life. Shopping, for example, can be enhanced by smartphones and/or smartphone capabilities such as checking prices, reading reviews, web searching, or the like. Similarly, the always-on and nearly instant access afforded by some mobile Internet-enabled cell phones can enable consumers to travel with and/or interact with almost endless resources that may be used by consumers during various activities.

Smartphones may include various onboard sensors and/or capabilities to communicate with various locally-located and/or remotely-located devices to monitor and/or track movements of the smartphones. The movements of the smartphones may be of little use, however, because these data may be obtained and maintained as simple data points. Furthermore, there may be no way to provide the various tracked data to a user in a meaningful and/or immediately actionable format.

As such, while some communications networks maintain and/or store various data associated with device movements, these data may be of little use to analysts and/or consumers. Rather, these data may be stored for various reasons but not shared with consumers and/or used by consumers in any way. Furthermore, various activities of mobile computing devices may be tracked and/or data associated with these activities may be stored, but there may be no meaningful way to use these data and/or to commercialize usage of these data.

SUMMARY

The present disclosure is directed to virtual historical displays that can be shared, surfaced, or otherwise provided to users at relevant times and locations that are relevant to users during some identified activities. The virtual historical displays can be used to provide users with relevant historical data from users and/or entities related to the users such as social networking connections, family members, group members, colleagues, or the like. These virtual historical displays can help users identify products or items of interest based upon related users' interests. In the context of shopping applications, the concepts and technologies described herein can simplify a shopping experience by generating and presenting a visual display that reveals or highlights relevant items and/or by generating a visual display that conceals irrelevant items. Thus, some embodiments of the concepts and technologies described herein can generate visual displays that can assist users in quickly identifying items suspected of being relevant and/or irrelevant based upon activities of related users.

In some embodiments, a server computer can execute a virtual display service and a mobile computing system that can communicate with the server computer such as a user device can execute a virtual display application. The virtual display application can be configured to activate onboard or remote movement tracking and/or to communicate with remotely-located presence detection systems or sensors. Thus, movements of the user device can be captured using onboard or remote sensors and/or other devices. The virtual display application also can be configured to capture interactions between the user device and items located at a particular location such as a retail store, a museum, another venue, or the like. In the context of a museum, for example, the interactions can include web searches or browsing time of the user, for example, while reading information located at a particular item. In the context of a retail store, the interactions can include, for example, price checks, web searches, purchases, or the like. It should be understood that these examples are illustrative and therefore should not be construed as being limiting in any way.

The virtual display application can capture behavioral data that encompasses activities of the user or user device at the location. The behavioral data can include data identifying the user and/or user device, data identifying various activities and/or movements at the location, geographical location information, related user information that identifies one or more users that are or may be related to the user, and/or other information. The behavioral data can be provided to the virtual display service and stored by the virtual display service at a local or remote data storage device. In some embodiments, the virtual display service can be configured to communicate with other devices such as social networking servers or services to obtain information that identifies or defines related users. Thus, the related user data can be provided by the user device or by other devices, if desired.

The virtual display service can receive a request for behavioral data. In some embodiments, the request is explicitly generated. For example, the request can include a service call, or the like, generated by a calling device or other computing system. The request can also include an implicitly generated request. For example, a request for the behavioral data can be generated by a virtual display application executed by the user device or the calling device when the user device or calling device enters a location. The request, whether implicitly generated or explicitly generated, can include contextual information that defines various aspects of activity of the calling device (or other device) such as a user associated with the activity, a location of the activity, or the like.

The virtual display service can compare the contextual information to the behavioral data to determine if the behavioral data is to be provided and/or to determine what behavioral data is to be provided. These determinations can be based, at least in part, upon a user and location identified by the contextual information and/or the behavioral data. Upon determining that the behavioral data, or a portion of the behavioral data, is to be provided to the calling device, the virtual display service can package the behavioral data and/or create virtual display data that can be provided to the calling device. The virtual display data can include graphical user interface elements such as layers, overlays, or the like, that may be ready for display at the calling device, as well as raw data that, when processed by the calling device, can be used to present the virtual historical displays.

The calling device can obtain the virtual display data or the behavioral data and generate and/or present the virtual historical display. The virtual historical display can include indicators showing how one or more users moved through a relevant location; information defining times and/or dates at which the activity depicted by the virtual historical displays occurred; items interacted with during the activity depicted; and/or other actions or activity. The virtual historical displays can be provided as augmented reality displays, lists of information, projected displays, and/or other views such as map views or the like. Thus, a user can view behavioral information of a relevant user to streamline and/or improve activities at a particular location.

According to one aspect of the concepts and technologies disclosed herein, a method is disclosed. The method can include obtaining, at a processor executing a virtual display service, behavioral data associated with a geographic location and an activity associated with a user of a user device. The processor can associate the behavioral data with the user device and the geographic location. The processor can detect subsequent activity associated with the geographic location, determine that the behavioral data is to be shared with a device associated with the subsequent activity, and provide the behavioral data to the device.

In some embodiments, determining that the behavioral data is to be shared can include receiving, from the device, a service call requesting the behavioral data. The service call can include contextual information relating to the subsequent activity. The contextual information can include an identity of an entity associated with the device and data identifying the geographic location. In some embodiments, the method can further include comparing, by the processor, the identity of the entity with related user data stored with the behavioral data to determine if the entity is related to the user, the related user data including social networking data.

In some embodiments, the method can further include generating, by the processor, virtual display data including a graphical user interface element based upon the behavioral data. Providing the behavioral data to the device can include providing the virtual display data to the device. In some embodiments, the device can execute a virtual display application that generates a virtual historical display based upon the behavioral data. The virtual historical display can include an augmented reality display that represents the activity of the user at the geographic location. In some embodiments, the device can include a projection system. The device can execute a virtual display application that generates a virtual historical display based upon the behavioral data. The virtual historical display can include a projected augmented reality display that represents the activity of the user at the geographic location by projecting graphical user interface elements at the geographic location.

In some embodiments, the device can execute a virtual display application that generates a virtual historical display based upon the behavioral data. The virtual historical display can include an augmented reality display that represents the activity of the user at the geographic location by concealing items at the geographic location that are not relevant to the activity. In some embodiments, the device can execute a virtual display application that generates a virtual historical display based upon the behavioral data. The virtual historical display can include an indicator that shows an action and a time associated with the activity of the user at the geographic location. The action can include a price check completed by the user using the user device. The action also can include a purchase completed by the user at the geographic location or elsewhere. In some embodiments, the device can execute a virtual display application that performs operations including generating a request for the behavioral data upon arriving at the geographic location, receiving the behavioral data, and presenting the behavioral data.

According to another aspect of the concepts and technologies disclosed herein, a system is disclosed. The system can include a processor and a memory. The memory can store computer-executable instructions that, when executed by the processor, cause the processor to perform operations including obtaining behavioral data associated with a geographic location and with an activity associated with a user of a user device, and associating the behavioral data with the user device and the geographic location. The operations further can include detecting subsequent activity associated with the geographic location, and determining that the behavioral data is to be shared with a device associated with the subsequent activity. The operations further can include providing the behavioral data to the device.

In some embodiments, determining that the behavioral data is to be shared with the device can include comparing a context of the subsequent activity to the behavioral data to determine if the behavioral data is to be shared with the device. In some embodiments, the device can execute a virtual display application that captures movements of the device using a gyroscope, an accelerometer, and a magnetometer. In some embodiments, the device can execute a virtual display application that generates a virtual historical display based upon the behavioral data. The virtual historical display can include one display selected from the group of displays including an augmented reality display that represents the activity of the user at the geographic location, a projected augmented reality display that represents the activity of the user at the geographic location by projecting graphical user interface elements at the geographic location using a projection system of the device, an augmented reality display that represents the activity of the user at the geographic location by concealing items at the geographic location that are not relevant to the activity, a virtual historical display including an indicator that shows an action and a time associated with the activity of the user at the geographic location, and a map display depicting the activity of the user at the geographic location.

According to another aspect of the concepts and technologies disclosed herein, a system is disclosed. The system can include a processor and a memory. The memory can store computer-executable instructions that, when executed by the processor, cause the processor to perform operations. The operations can include obtaining behavioral data associated with a geographic location and with an activity associated with a user of a user device including a smartphone, associating the behavioral data with the user device and the geographic location, detecting subsequent activity associated with the geographic location, the subsequent activity being associated with a calling device, comparing a context of the subsequent activity to the behavioral data to determine if the behavioral data is to be shared with the calling device, determining that the behavioral data is to be shared with the calling device, and providing the behavioral data to the calling device for display to an entity associated with the calling device.

In some embodiments, the calling device can include a mobile telephone that executes a virtual display application that captures movements of the device using orientation sensors of the calling device. The orientation sensors can include a gyroscope, an accelerometer, and a magnetometer. In some embodiments, the behavioral data can include user data identifying a user of the user device, activity data that describes the activity of the user at the geographic location, location data defining the geographic location, and related user data identifying a related entity that is related to the user based upon a social networking connection. In some embodiments, the system can further include detection mechanisms located at the geographic location. The detection mechanisms can capture movements of the user device and the calling device at the location.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
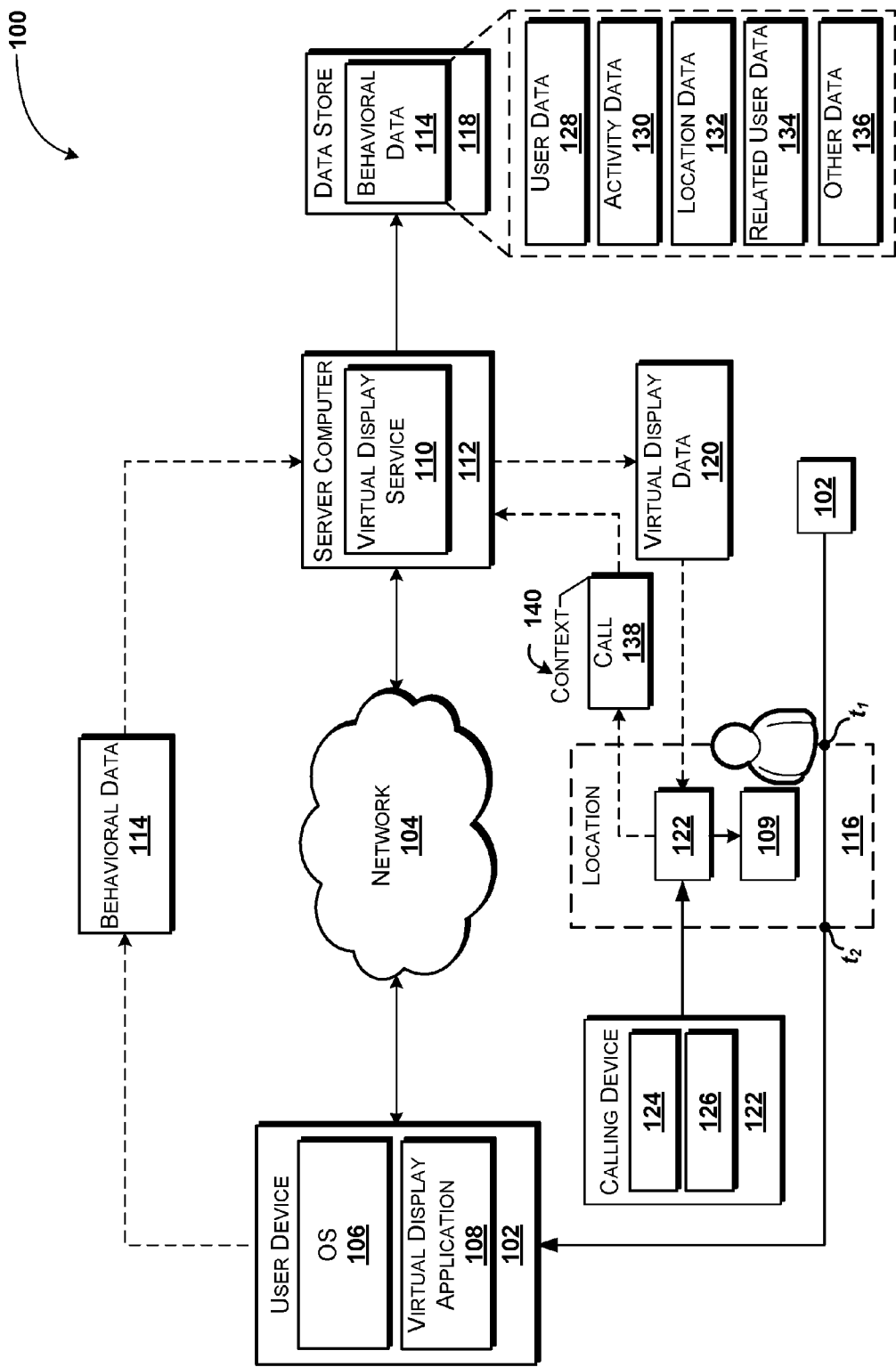
FIG. 1 is a system diagram illustrating an illustrative operating environment for various embodiments of the concepts and technologies described herein, according to an illustrative embodiment.

The following detailed description is directed to virtual historical displays that can be provided to users at relevant times and locations that are relevant to activities with which the users are involved. The virtual historical displays can be used to provide users with relevant historical data from users and/or entities related to the users. In some embodiments, a server computer executes a virtual display service and a mobile computing system such as a user device executes a virtual display application. The virtual display application can be configured to capture or request capturing of movements using onboard or remote sensors and/or other devices. The virtual display application also can be configured to capture interactions between the user device and items located at a particular location. The virtual display application can capture behavioral data that encompasses activities of the user or user device at the location. The behavioral data can be provided to the virtual display service and stored by the virtual display service at a local or remote data storage device.

The virtual display service can receive a request for behavioral data. The virtual display service can compare contextual information associated with the activity and/or the request to the behavioral data to determine if the behavioral data is to be provided and/or to determine what behavioral data is to be provided. The contextual information also can be used to generate displays based upon relative positions between the user and the related user at a current time and/or other times. Upon determining that the behavioral data is to be provided to the calling device, the virtual display service can package the behavioral data and/or create virtual display data that can be provided to the calling device. The calling device can obtain the virtual display data or the behavioral data and generate and/or present the virtual historical display. The virtual historical display can include indicators showing how one or more users moved through a relevant location; information defining times and/or dates at which the activity depicted by the virtual historical displays occurred; items interacted with during the activity depicted; and/or other actions or activity. The virtual historical displays can be provided as augmented reality displays, lists of information, projected displays, and/or other views such as map views or the like. Thus, a user can view behavioral information of a relevant user to streamline and/or improve activities at a particular location.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and interacting with virtual historical displays will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more smartphones, feature phones, personal digital assistants ("PDAs"), tablet computers, smart watches, mobile media devices, other computing devices, combinations thereof, or the like. In some other embodiments, the functionality of the user device 102 may be provided by one or more laptop computers, other computing systems, or the like. It should be understood that the functionality of the user device 102 can be provided by a single device and/or by multiple devices. For purposes of describing the concepts and technologies disclosed herein, the user device 102 is described herein as a mobile computing device such as a smartphone. It should be understood that this embodiment is illustrative, and should not be construed as being limiting in any way.

The user device 102 can execute an operating system 106, one or more application programs (not shown in FIG. 1), and a virtual display application 108. The operating system 106 can include an executable program that controls the operation of the user device 102. The application programs and/or the virtual display application 108 can include executable programs configured to execute on top of the operating system 106 to provide various functions. In some embodiments, the application programs can include, but are not limited to, web browsers, web applications, mail applications, native applications, media applications, camera and/or video applications, combinations thereof, or the like. Because various embodiments of application programs are generally known, the application programs are not described in additional detail herein.

The virtual display application 108 can be configured to provide the functionality described herein for obtaining and/or generating data used to create a virtual historical display 109. The virtual display application 108 also can be configured to provide the functionality described herein for generating, displaying, and/or supporting interactions with a virtual historical display 109. According to various embodiments, the virtual display application 108 also can be configured to communicate with a virtual display service 110 that is hosted and/or executed by a computing system such as, for example, a server computer 112. The functionality of the server computer 112 can be provided by one or more real or virtual computing resources. The functionality of the server computer 112 additionally or alternatively can be provided by multiple distributed computing resources, if desired. As such, the illustrated embodiment showing a single server computer 112 is illustrative of only one contemplated embodiment and therefore should not be construed as being limiting in any way.

According to various embodiments of the concepts and technologies described herein, the virtual display service 110 can be executed by the server computer 112 and can be configured to generate or obtain behavioral data 114. The behavioral data 114 can include data defining how a user or other entity enters, exits, moves within, and/or interacts with items at a particular location 116. Thus, for example, the behavioral data 114 can indicate a time or date $t_1$ at which a user (or a device associated with the user) enters the location 116, movements of the user within or at the location 116, interactions with items at the location 116, and/or a time or date $t_2$ at which the user leaves the location 116. As will be explained in additional detail below, the virtual display application 108 executed by the user device 102 and/or similar functionality executed or hosted by other devices can be configured to generate the behavioral data 114 and/or provide the behavioral data 114 to the virtual display service 110.

In particular, the virtual display application 108 can be configured to capture data that indicates movements of the user device 102 and/or various interactions between a user and items or structure associated with the location 116 based upon detected movements and/or other operations associated with the user device 102. In some embodiments, for example, the location 116 can correspond to a retail or other location, and the detected movements can correspond to a path of a user or other individual through the retail or other location; interactions between the user and products and/or structures at or near the location 116; price scans, review searches, web searches, or the like associated with a product or item located at the location 116; purchases at the location 116; and/or other interactions with items at or near the location 116. Because these and/or additional or alternative interactions are possible and are contemplated, it should be understood that these examples are merely illustrative of some possible interactions and/or movements, and that therefore these examples should not be construed as being limiting in any way.

The virtual display service 110 can be configured to store the behavioral data 114 at a local or remote data storage device or location ("data storage location"). The data storage location can include one or more real or virtual data storage locations such as, for example, a memory, a server computer, a database, a data store, or the like. In the illustrated embodiment shown in FIG. 1, the virtual display service 110 can be configured to store the behavioral data 114 at a data store 118. The data store 118 can be hosted by the server computer 112 or remotely located relative to the server computer 112. According to various embodiments, the functionality of the data store 118 can be provided by one or more server computers, databases, laptop computers, memory devices, hard drives or other mass storage devices, virtual storage resources, combinations thereof, or the like.

According to various embodiments, the virtual display service 110 also can be configured to receive and respond to calls for the behavioral data 114. In particular, users or other callers can request access to the behavioral data 114 to provide the functionality described herein for generating and/or providing virtual historical displays 109. As will be explained in more detail below, the virtual display service 110 can access and analyze the behavioral data 114. The virtual display service 110 can be configured to determine if a user or device calling the virtual display service 110 is to receive virtual display data 120 for presentation at a device associated with the user or device.

The determination as to whether or not the virtual display data 120 is to be provided, as well as determinations as to what data is to be included with or as the virtual display data 120, can be made by the virtual display service 110 based upon contents of the behavioral data 114, as well as contextual data obtained from a calling device or user. In the illustrated embodiment, the calling device or user is illustrated as a calling device 122. The calling device 122 can execute an operating system 124 and a virtual display application 126. It should be understood that the calling device 122 can be similar or even identical to the user device 102, that the operating system 124 can be similar or even identical to the operating system 106, and/or that the virtual display application 126 can be similar or even identical to the virtual display application 108. Because the functionality described herein for providing virtual historical displays 109 can be provided in a variety of ways and can entail additional and/or alternative devices and functionality, it should be understood that the example shown in FIG. 1 is illustrative and therefore should not be construed as being limiting in any way.

In the illustrated embodiment, the behavioral data 114 includes user data 128, activity data 130, location data 132, related user data 134, other data 136, combinations thereof, or the like. Some examples of user data 128, activity data 130, location data 132, related user data 134, and other data 136 are provided and described below. Because the behavioral data 114 can include these and/or other types of data, and because the behavioral data 114 can omit the above-mentioned (and further described below) types of data, it should be understood that these examples are illustrative. As such, the embodiment shown in FIG. 1 should not be construed as being limiting in any way.

The user data 128 can include, for example, data that defines a user associated with the virtual display service 110 and/or a particular instance of behavioral data 114. The user data 128 can include various types of data that identify users of the virtual display service 110 and/or users associated with the behavioral data 114. According to various embodiments, the user data 128 can include, for example, a user identification ("userID"); a telephone number; data generated by a universal integrated circuit card ("UICC"), subscriber identity module ("SIM"), universal subscriber identity module ("USIM"), or other module; an international mobile equipment identifier ("IMEI"), international mobile subscriber identifier ("IMSI"), serial number, or other identifier for the user or equipment; a login and/or password; a name; an account number; combinations thereof; or the like. Thus, the user data 128 can be used to identify a user or a device or other equipment associated with the user.

The activity data 130 can include, but is not limited to, data defining activities of a user, user device 102, or other entity or device at or near a location such as the location 116. The activity data 130 can include various information that indicates movements of the user device 102 or other device at or near the location 116; time and/or date information related to interactions of the user, user device 102, or other entities or devices at or near the location 116; purchases, price checks, web searches, bar code scans, review requests, or the like, associated with items at or near the location 116; combinations thereof; or the like. In one contemplated example, where the behavioral data 114 describes shopping and/or purchase activity of the user at or near the location 116, the activity data 130 can embody, for example, movements of the user at, near, or within the location 116; price checks, review requests, product scans, purchases, or the like associated with an item at or near the location 116; time durations at particular locations and/or interacting with items at or near the location 116;

entrance and/or exit times relating to activities at the location 116; combinations thereof; or the like. It should be understood that this example is illustrative and therefore should not be construed as being limiting in any way.

The location data 132 can include, but is not limited to, data specifying a particular geographic location and/or an entity located at the geographic location. Thus, for example, the location data 132 can identify a particular geographic location by way of, for example, a street address, coordinates, or other information. In some other embodiments, the location data 132 can identity an entity located at the particular geographic location such as, for example, a particular retail location located at the geographic location, a business or service located at the geographic location, a venue located at the geographic location, a user or other entity located at or associated with the geographic location, combinations thereof, or the like. Thus, the location data 132 can be used to associate a user identifier and activity information with a particular geographic location.

The location data 132 also can include location information associated with movements at or within a geographic location and/or a venue or facility associated with an entity at the geographic location. Thus, for example, the location data 132 can indicate movements of an entity within a venue or other facility in addition to, or instead of, specifying a geographic location of the venue itself. As such, the location data 132 can specify a venue with which particular user data 128, activity data 130, other data 136, or the like is associated as well as movements within the venue to be associated with the particular user data 128, activity data 130, other data 136, or the like. This aspect of the location data 132, namely the monitoring of movements within or at a venue or the like, will be more clearly understood with reference to the description of the various concepts and technologies described herein below.

The location data 132 can be captured or determined by a location server (not shown in FIG. 1), the user device 102, and/or other devices or hardware using various location-determination technologies. For example, the user device 102 can include one or more global positioning system ("GPS") receivers via which the user device 102 can determine a location of the user device 102. Additionally or alternatively, the user device 102 can use one or more assisted GPS ("A-GPS") technologies to determine location such as, for example, scanning a proximity associated with the user device 102 to determine one or more wireless network equipment identities, location beacons, or the like in communication with the user device 102. Additionally, or alternatively, the user device 102 can execute one or more location determination applications configured to determine a location of the user device 102 by monitoring movements of the user device using various sensors such as, for example, magnetometers, accelerometers, gyroscopes, or the like.

The user device 102, a network device or software in communication with the server computer 112, and/or a location server can rely upon triangulation techniques to determine a location associated with the user device 102 and/or other devices, users, or resources. For example, the user device 102 can communicate with three or more WiFi routers, cellular towers, or other wireless transmitters and/or transceivers to determine a location of the user device 102 using triangulation. Additionally, or alternatively, the virtual display service 110 can obtain location data from a cellular network and/or other networks or devices relating to a particular user or device such as the user device 102. Because various technologies and/or combinations thereof can be used to determine location, it should be understood that these examples are illustrative and therefore should not be construed as being limiting in any way.

The related user data 134 can include, but is not limited to, data identifying users or other entities related to a particular user. Thus, for example, if behavioral data 114 is generated based upon activities of a first user "UserA" at a particular location, the related user data 134 can specify one or more users or other entities who are related to UserA. According to various embodiments, the related user data 134 is generated based upon one or more social networking connections of the first user, UserA. Thus, users may interact with the virtual display service 110 to share social networking accounts and/or social networking data with the virtual display service 110. For example, users may share contact lists, social networking account login information, and/or other information that can be used by the virtual display service 110 to identify relationships between users, desired. In some embodiments, users may share relationship information directly with the virtual display service 110. Thus, the related user data 134 can be generated with or without user input.

According to some other embodiments, the related user data 134 can be based upon known or suspected familial relationships (e.g., users of a family plan may be assumed to be related), business relationships (e.g., users who share a common billing address or payor address may be assumed to be related), or other relationships may be detected and captured by the related user data 134 or shared by users.

The related user data 134 can be used to identify behavioral data 114 of a first user that is to be surfaced to a subsequent user. According to various embodiments, the subsequent user can include a social networking connection of the first user. This embodiment is described herein for clarity, but should be understood as being merely illustrative of one contemplated embodiment of the concepts and technologies described herein.

In one specific example, a first user shops at a particular venue and behavioral data 114 is captured. The behavioral data 114 can specify the user and/or a user device 102 used by the user at the venue; activities of the user at the venue such as times and dates of the activities, prices checks and/or purchases made at the venue, or the like; a geographic location of the venue and movements of the user within or at the venue; one or more users or social networking connections associated with the user; and/or other information associated with the user's experience at or near the venue.

Thus, when a social networking connection of the user arrives at the particular venue and the functionality described herein for providing virtual historical displays 109 is explicitly or implicitly requested, the virtual display service 110 can identify behavioral data 114 that is to be surfaced to the social networking connection and provide that behavioral data 114 to the social networking connection for consumption. In some embodiments, the behavioral data 114 can be provided as the virtual display data 120, though this is not necessarily the case. It should be understood that this example is illustrative and therefore should not be construed as being limiting in any way.

The other data 136 can include, but is not limited to, user, software, and/or service software settings; options; parameters; and/or other configuration information associated with the virtual display service 110. Some examples of user and/or application preferences can include, for example, how related users are identified, what types of information are to be shared with other users and/or what types of information are to be surfaced to users, what types of sensors and/or other functionality is to be used to provide the virtual historical displays 109, what types of activities are to be monitored and/or captured by the virtual display application 108 and/or the behavioral data 114, preferences, or the like.

As noted above, the behavioral data 114 can be stored at the data store 118 and can be used by the virtual display application 108 and/or the virtual display service 110 to provide the functionality described herein for generating and/or providing virtual historical displays 109. The virtual display service 110 can access the behavioral data 114 to identify user data 128, activity data 130, location data 132, related user data 134, and/or other data 136 associated with a particular user and/or user device 102. The virtual display service 110 can use the identified data to generate virtual display data 120 and/or to provide the virtual display data 120 to a calling device 122.

As will be explained in more detail below, the user device 102 can enter or pass through a location 116. When the user device 102 is located at the location 116, the virtual display application 108 can be explicitly or implicitly invoked to track movements and/or interactions of the user within the location 116. The virtual display application 108 can also access devices located at or near the location 116 to track movements of the user device 102 at or near the location 116 instead of, or in addition to, tracking the movements. According to various embodiments, the location 116 may be equipped with various location determination devices, detection mechanisms, and/or systems such as location beacons; near field communication ("NFC") devices; radio frequency identifier ("RFID") devices; infrared ("IR") cameras or detectors; cameras; proximity sensors; presence sensors; combinations thereof, or the like. According to some other embodiments, the user device 102 can activate one or more on-board location, movement, and/or orientation sensors such as gyroscopes, magnetometers, accelerometers, combinations thereof, or the like to capture movements of the user device 102. Thus, location determination or detection mechanisms can track movements of the user device 102 and/or other users or devices at or near the location 116, if desired.

The movements of the user device 102 can be captured as and/or be included in behavioral data 114 that is provided to the virtual display service 110 by the user device 102. The behavioral data 114 also can include other data generated by the user device 102 and/or provided to the virtual display service 110 by the user device 102 and/or other entities in communication with the virtual display service 110. For example, as explained above, the behavioral data 114 can include user data 128, activity data 130, location data 132, other data 136, or the like. The virtual display service 110 also can obtain and/or generate the related user data 134 and store the related user data 134 with the behavioral data 114, if desired. The virtual display service 110 can store the behavioral data 114 at the data store 118 or another data storage location.

At some point in time, a device or user can enter the location 116. In some embodiments, the device or user can include the same user and/or the same user device 102, while in some other embodiments, the device or user can include a social networking connection of the user and/or a device associated with the social networking connection such as the calling device 122. The calling device 122 can generate an explicit or implicit request to use the virtual display service 110. In some embodiments, for example, an implicit request can include an opt-in action by the social networking connection or otherwise activating the virtual display application 126 executed by the calling device 122. In some other embodiments, a user may explicitly request a virtual historical display 109 via various types of commands and/or input.

For example, the calling device 122 can generate a call or other type of request ("call") 138 and transmit the call 138 to the virtual display service 110.

As will be explained in more detail below, the virtual display service 110 can analyze the call 138 and/or contextual information ("context") 140 included in or associated with the call 138. The context 140 can indicate, for example, a user identity, a location, an activity, or the like. The context 140 also can represent a specific location, within a broader location or venue, at which the calling device 122 is currently located. Thus, for example, the context 140 can provide a location within a building or other venue to enable relative locations of past activity to be calculated and used when generating the virtual historical displays 109 and/or for other purposes. As will be more clearly understood with reference to FIGS. 4A-4D below, the use of relative locations can be used to provide augmented reality displays and/or other displays that are based, at least partially, upon a location of the user or device associated with the user viewing the augmented reality displays.

The context 140 also can include data identifying the location 116, data identifying a device used or carried by the user or other entity associated with the subsequent activity, other information, or the like. The virtual display service 110 can determine, based upon the call 138 and the behavioral data 114, if behavioral data 114 is to be surfaced to the calling device 122. It can be appreciated from the above description of the behavioral data 114 that the determination of the virtual display service 110 can be based upon the call 138, the context 140 indicated by and/or included with the call 138, and various aspects of the behavioral data 114 such as the user data 128, activity data 130, location data 132, related user data 134, other data 136, combinations thereof, or the like.

The virtual display service 110 can access the behavioral data 114 and analyze the behavioral data 114. During the analysis of the behavioral data 114, the virtual display service 110 can determine what, if any, portion or portions of the behavioral data 114 are to be provided to the calling device 122. The virtual display service 110 also can generate virtual display data 120 to be provided to the calling device 122. The virtual display data 120 can include an overlay or other graphical user interface ("GUI") layers or elements that are to be displayed by the calling device 122 to provide a virtual historical display 109. These and other aspects of the concepts and technologies described herein will be more clearly understood with reference to FIGS. 2-4D below.

The calling device 122 can receive the virtual display data 120 and present the virtual display data 120. In the embodiment illustrated in FIG. 1, the calling device 122 can generate a user interface for presenting the virtual display data 120 to a user or other entity. The user or other entity may view the virtual display data 120 on a display of the calling device 122 and/or in other displays such as projected augmented reality displays or the like, as will be more clearly understood below, particularly with reference to FIGS. 4A-4D.

The user of the calling device 122 can view the virtual display data 120 to understand how a related user or connection, for example a social networking connection, moved through and/or interacted with items at the location 116. By surfacing this information to the user or other entity associated with the calling device 122, the user or other entity can be informed about how related users have interacted at the location 116, which may be of interest to the user. It should be understood that this example is illustrative and therefore should not be construed as being limiting in any way. These and other aspects of the concepts and technologies described herein for generating, presenting, and/or interacting with virtual historical displays 109 will be illustrated and described in more detail below.

FIG. 1 illustrates one user device 102, one network 104, one server computer 112, one data store 118, one location 116, and one calling device 122. It should be understood, however, that various implementations of the operating environment 100 include zero, one, or more than one user device 102, zero, one, or more than one network 104, zero, one, or more than one server computer 112, zero, one, or more than one data store 118, zero, one, or more than one location 116, and/or zero, one, or more than one calling device 122. As such, the illustrated embodiment should be understood as being illustrative, and should not be construed as being limiting in any way.

Figure 2:
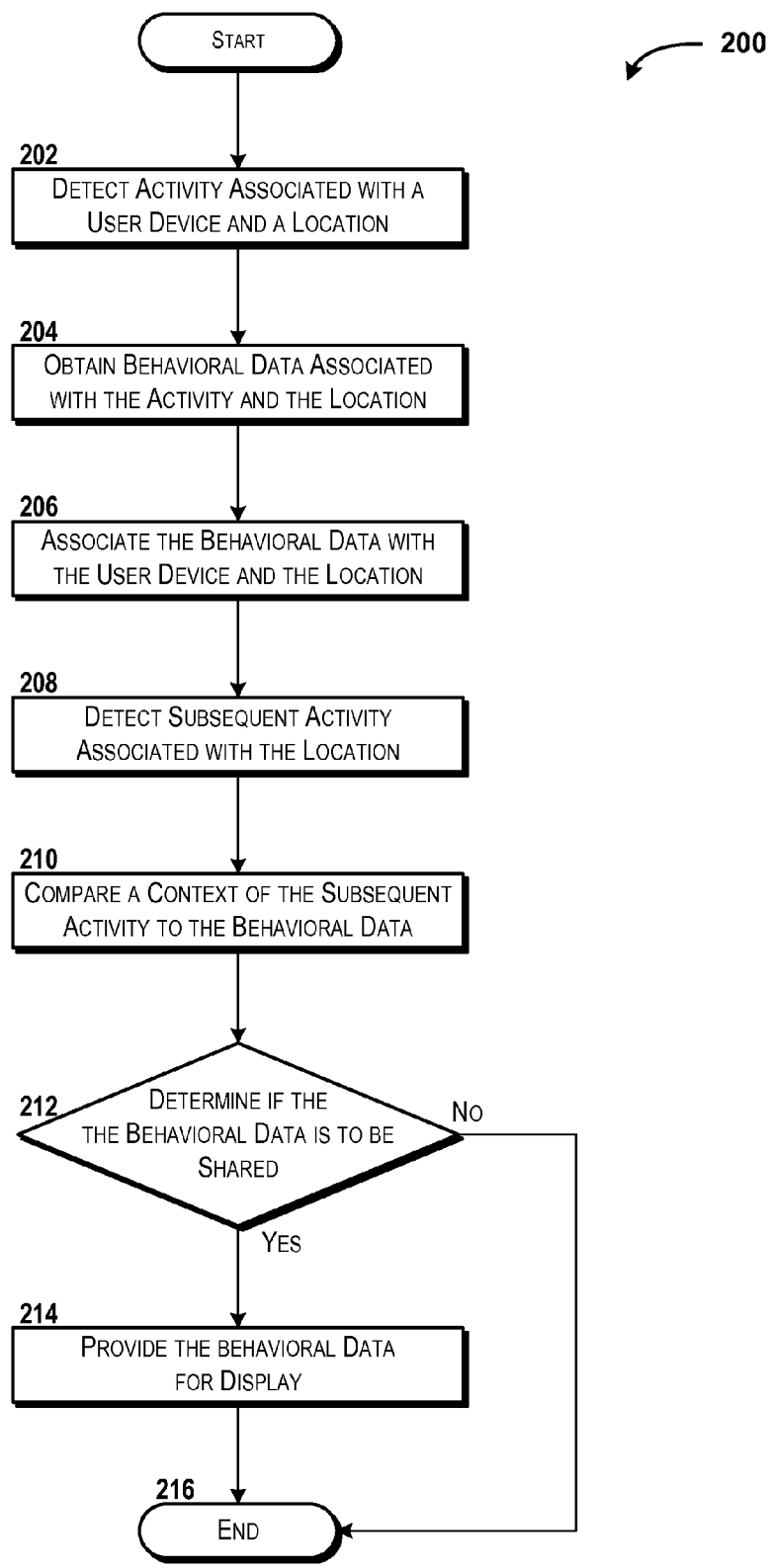
FIG. 2 is a flow diagram showing aspects of a method for obtaining and generating data used to provide virtual historical displays, according to an illustrative embodiment.

Turning now to FIG. 2, aspects of a method 200 for obtaining and generating data used to provide virtual historical displays 109 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example the user device 102 and/or the server computer 112 to perform one or more operations and/or causing the processor to direct other components of the computing system or device to perform one or more of the operations.

For purposes of illustrating and describing the concepts of the present disclosure, the methods disclosed herein are described as being performed by the user device 102 and/or the server computer 112 via execution of one or more software modules such as, for example, the virtual display application 108 and/or the virtual display service 110. It should be understood that additional and/or alternative devices and/or network nodes can provide the functionality described herein via execution of one or more modules, applications, and/or other software including, but not limited to, the virtual display application 108 and/or the virtual display service 110. Thus, the illustrated embodiments are illustrative, and should not be viewed as being limiting in any way.

The method 200 begins at operation 202. At operation 202, the server computer 112 detects activity associated with a user device 102. According to various embodiments, the activity detected in operation 202 is associated with a particular location such as the location 116 shown in FIG. 1. The activity, as explained above, can include a user or other entity, or a device associated with the user or other entity, entering a particular area, region, building, venue, or other location such as the location 116 illustrated and described above with reference to FIG. 1.

The activity also can include various activities at or near the location 116 such as movements within, at, or near the location 116; lack of movement within, at, or near the location 116; interactions with items within, at, or near the location 116; electronic activity within, at, near, and/or associated with the location 116; combinations thereof; or the like. According to various examples of the concepts and technologies described herein, the activity detected in operation 202 can include a user or other entity entering, moving within, or exiting a particular venue such as the location 116. This activity can be detected by the virtual display application 108 and/or detected in response to a user command or other input requesting functionality associated with the virtual display service 110, for example, by way of submitting a request or application call such as the call 138 illustrated and described herein. It should be understood that these examples are illustrative and therefore should not be construed as being limiting in any way.

From operation 202, the method 200 proceeds to operation 204. At operation 204, the server computer 112 obtains behavioral data 114. According to various embodiments, the behavioral data 114 obtained in operation 204 is associated with the activity detected in operation 202 and the location 116. As explained herein, the behavioral data 114 obtained in operation 204 can capture activity of a user or other entity associated with the user device 102 at the location 116.

With reference to the examples described herein for obtaining behavioral data 114 corresponding to activities of a user at or near a retail location, the behavioral data 114 obtained in operation 204 can include time and date information specifying times and dates at which a user or other entity enters the location 116 and/or times or dates at which the user moves or stops moving with the location 116; locations, relative locations, and/or movements of the user within the location 116; interactions of the user with items at the location 116 such as products, electronic devices, or other items; electronic activity associated with the user and the location 116 such as web searches, price checks, product scans, purchases, and/or online ordering; location information such as geographic location information and/or locations within the location 116; and/or other information as described hereinabove with reference to FIG. 1. Because the behavioral data 114 can be captured with respect to other entities, it should be understood that this example is illustrative and therefore should not be construed as being limiting in any way.

From operation 204, the method 200 proceeds to operation 206. At operation 206, the server computer 112 associates the behavioral data 114 obtained in operation 204 with the user device 102 and the location 116. According to various embodiments, the server computer 112 can capture location data 132 and user data 128 and associate these types of data with other types of behavioral data 114 that specifies activities and/or other aspects of user interactions with or at the location 116. According to various embodiments, the data can include a data association with a particular location and/or user, though this is not necessarily the case.

From operation 206, the method 200 proceeds to operation 208. At operation 208, the server computer 112 detects a subsequent activity associated with the location 116. The subsequent activity can correspond to the same user with whom the behavioral data 114 was obtained in operation 204, in some embodiments. Thus, a user may return to a particular location and obtain behavioral data 114 that defines or represents previous activities at or near a particular location 116, if desired. In some other embodiments, the subsequent activity can be associated with a different user or other entity such as a social networking connection. Thus, a user may enter a particular location and obtain behavioral data 114 that defines or represents activities of other entities at or near a particular location 116, if desired.

It should be understood that the functionality described herein with reference to operation 208 can occur at almost any time after the functionality described herein with reference to operations 202-206. For purposes of illustrating and describing the various embodiments of the concepts and technologies described herein, operation 208 is described as occurring when an entity related to the user enters the location 116. In some embodiments, the entity is a social networking connection of the user. It should be understood that this example is illustrative and therefore should not be construed as being limiting in any way.

The social networking connection may enter the location with an electronic device that is configured to communicate with and/or access functionality associated with the virtual display service 110. In the embodiment shown in FIG. 1, the social networking connection enters the location 116 with a calling device 122. As noted above, the calling device 122 can be configured to execute an operating system 124 and a virtual display application 126 that may be similar or even identical to the operating system 106 and the virtual display application 108 of the user device 102.

The server computer 112 can detect the subsequent activity by communicating with the virtual display application 126 and/or by receiving a request or call such as the call 138 from the calling device 122. Because the server computer 112 can detect the subsequent activity in additional and/or alternative manners, it should be understood that these examples are illustrative and therefore should not be construed as being limiting in any way.

From operation 208, the method 200 proceeds to operation 210. At operation 210, the server computer 112 can compare a context of the subsequent activity to the behavioral data 114 stored in the data store 118. From the description of FIG. 1, above, it can be appreciated that the context of the subsequent activity can be embodied as the context 140, though this is not necessarily the case. The context 140 can indicate, for example, data identifying the location 116, data identifying a user or other entity associated with the subsequent activity, other information, or the like. Thus, the server computer 112 can, by comparing the context 140 to the behavioral data 114, determine if behavioral data 114 associated with the location 116, an entity related to the user associated with the subsequent activity, an activity associated with the subsequent activity, or the like.

From operation 210, the method 200 proceeds to operation 212. At operation 212, the server computer 112 determines if the behavioral data 114 associated with the location 116 is to be shared with, surfaced to, or otherwise presented ("shared") to a user or other entity. The server computer 112 can determine if the behavioral data 114 is to be shared based upon a determination that a context of the subsequent activity and the information included in the behavioral data 114 are similar, based upon an explicit request for the behavioral data 114 such as the call 138, or the like. Because the server computer 112 can determine if the behavioral data 114 is to be shared based upon additional or alternative considerations, it should be understood that these examples are illustrative and therefore should not be construed as being limiting in any way.

If the server computer 112 determines, in operation 212, that the behavioral data 114 is to be shared, then the method 200 can proceed to operation 214. In operation 214, the server computer 112 provides the behavioral data 114 for display. According to various embodiments, the behavioral data 114 can be provided to the user device 102, the calling device 122, and/or other devices and/or entities.

In some embodiments, the behavioral data 114 can be packaged as the virtual display data 120 and provided to the entities. In some embodiments, the server computer 112 creates the virtual display data 120 as graphical user interface elements such as layers, overlays, or the like. In some other embodiments, the virtual display data 120 can be provided to the user device 102, the calling device 122, and/or other devices and presented via execution of the virtual display application 108 or the virtual display application 126. As such, it can be appreciated that the server computer 112 can generate graphical user interface elements and/or that the server computer 112 can provide data to other devices that may be configured to generate the graphical user interface elements.

From operation 214, the method 200 proceeds to operation 216. The method 200 also can proceed to operation 216 from operation 212 if the server computer 112 determines, in operation 212, that the behavioral data 114 is not to be shared. The method 200 ends at operation 216.

Figure 3:
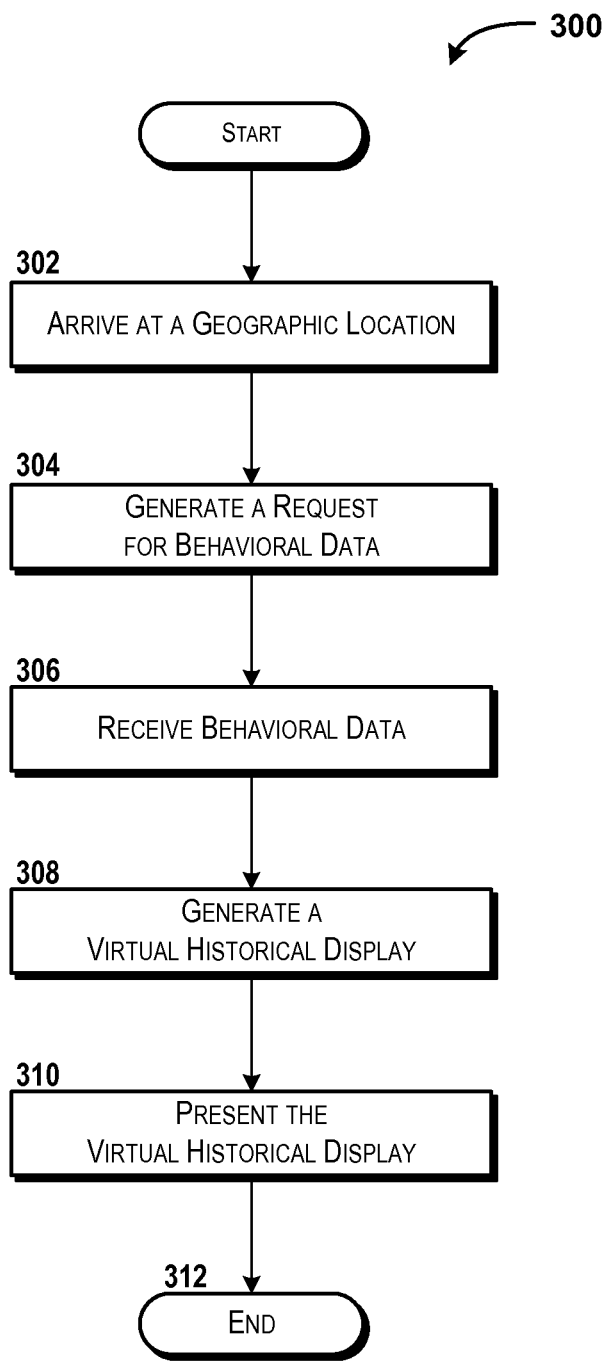
FIG. 3 is a flow diagram showing aspects of a method for presenting a virtual historical display, according to an illustrative embodiment.

Turning now to FIG. 3, aspects of a method 300 for presenting a virtual historical display 109 will be described in detail, according to an illustrative embodiment. For purposes of illustrating and describing the concepts and technologies described herein, the method 300 is described as being performed by the calling device 122. Because other devices such as the user device 102 or other computing devices can perform the operations of the method 300, it should be understood that this example is illustrative and therefore should not be construed as being limiting in any way.

The method 300 begins at operation 302. At operation 302, the calling device 122 arrives at a geographic location. In some embodiments, the calling device 122 can arrive at a location such as, for example, the location 116 shown in FIG. 1. According to various embodiments, the calling device 122 can determine that the calling device 122 has arrived at the geographic location based upon periodic location determinations; based upon detecting presence of electronic location devices such as location beacons, WiFi equipment, network devices, or the lie; based upon information received from a network; based upon an indication from a user of the calling device 122; and/or in other ways.

In some embodiments, the calling device 122 executes a virtual display application 126 that is configured to periodically determine a geographic location of the calling device 122. Thus, operation 302 can correspond to the calling device 122 determining that the calling device 122 has arrived at a particular geographic location. Because the calling device 122 can determine that the calling device 122 has arrived at a particular geographic location in additional and/or alternative ways, it should be understood that these examples are illustrative and therefore should not be construed as being limiting in any way.

From operation 302, the method 300 proceeds to operation 304. At operation 304, the calling device 122 generates a request for behavioral data 114. The request can be generated implicitly and/or explicitly. In some embodiments, for example, the calling device 122 can generate the call 138 described above with reference to FIG. 1. In some other embodiments, the calling device 122 can implicitly request the behavioral data 114 without any explicit command by the user and/or the calling device 122. For example, the virtual display application 126 executed by the calling device 122 can be configured to obtain the behavioral data 114 when the calling device 122 arrives at particular locations and/or types of locations.

For purposes of illustrating and describing the various embodiments of the concepts and technologies described herein, operation 304 is described herein with reference to an embodiment wherein the calling device 122 generates the call 138 and includes, in the call 138, context 140 that identifies a user of the calling device 122, a geographic location at which the call 138 is generated, and time and/or date information. It should be understood that this example is illustrative and therefore should not be construed as being limiting in any way.

From operation 304, the method 300 proceeds to operation 306. At operation 306, the calling device 122 receives behavioral data 114. It can be appreciated from the description of FIG. 2 that the behavioral data 114 can be received from the virtual display service 110 as the behavioral data 114 and/or as the virtual display data 120. In some embodiments, the calling device 122 receives the behavioral data 114 and/or the virtual display data 120 from the virtual display service 110. In some other embodiments, the calling device 122 obtains the behavioral data 114 and/or the virtual display data 120 by downloading and/or otherwise accessing the behavioral data 114 and/or the virtual display data 120 from the virtual display service 110. Because the behavioral data 114 and/or the virtual display data 120 can be obtained in additional and/or alternative ways, it should be understood that these examples are illustrative and therefore should not be construed as being limiting in any way.

From operation 306, the method 300 proceeds to operation 308. At operation 308, the calling device 122 generates a virtual historical display 109. The virtual historical display 109 can include various types of graphical user interfaces that can be presented to a user of the calling device 122 to surface the behavioral data 114 to the user in a relevant and meaningful way. As will be illustrated and described in more detail below, particularly with reference to FIGS. 4A-4D, the virtual historical displays 109 can include map views and/or displays; augmented reality displays; projected augmented reality displays; combinations thereof; or the like.

By viewing the virtual historical displays 109, a user of the calling device 122 can understand how a related user moved at and/or interacted with an environment at or near the calling device 122. The virtual historical display 109 also can depict commerce activities of the related user, as will be explained in additional detail hereinbelow. For example, the virtual historical display 109 can depict time spent by the related user at a location or area within a store or other location 116, price checks or web searches conducted by the related user within the location 116, purchases made by the related user at the location 116, combinations thereof, or the like. These and other aspects of the virtual historical displays 109 are illustrated and described in more detail herein.

In some embodiments, the calling device 122 generates the virtual historical display 109 based upon the behavioral data 114 and/or the virtual display data 120. In some other embodiments, the calling device 122 receives data that is configured for display as the virtual historical display 109 without additional processing at the calling device 122. Thus, operation 308 can include the calling device 122 receiving and processing the behavioral data 114 and/or the virtual display data 120 or the calling device 122, while some other embodiments of operation 308 can include the calling device 122 receiving the behavioral data 114 and/or the virtual display data 120 without additionally processing the behavioral data 114 and/or the virtual display data 120.

From operation 308, the method 300 proceeds to operation 310. At operation 310, the calling device 122 presents the virtual historical display 109. The calling device 122 can present the virtual historical display 109 as a graphical user interface such as a map display; a list of items viewed, purchased, and/or otherwise interacted with by the related user; as an augmented reality display that shows a path of the related user; as an augmented reality display that shows interactions with items; as a projected augmented reality display that shows movements of the related user and/or interactions between the related user and items; as an augmented reality display that obfuscates or otherwise conceals irrelevant data from the user; combinations thereof; or the like.

From operation 310, the method 300 proceeds to operation 312. The method 300 ends at operation 312.

FIGS. 4A-4D show aspects of UIs for interacting with, configuring, and/or providing functionality associated with a virtual display service, according to some illustrative embodiments of the concepts and technologies described herein.

Figure 4A:
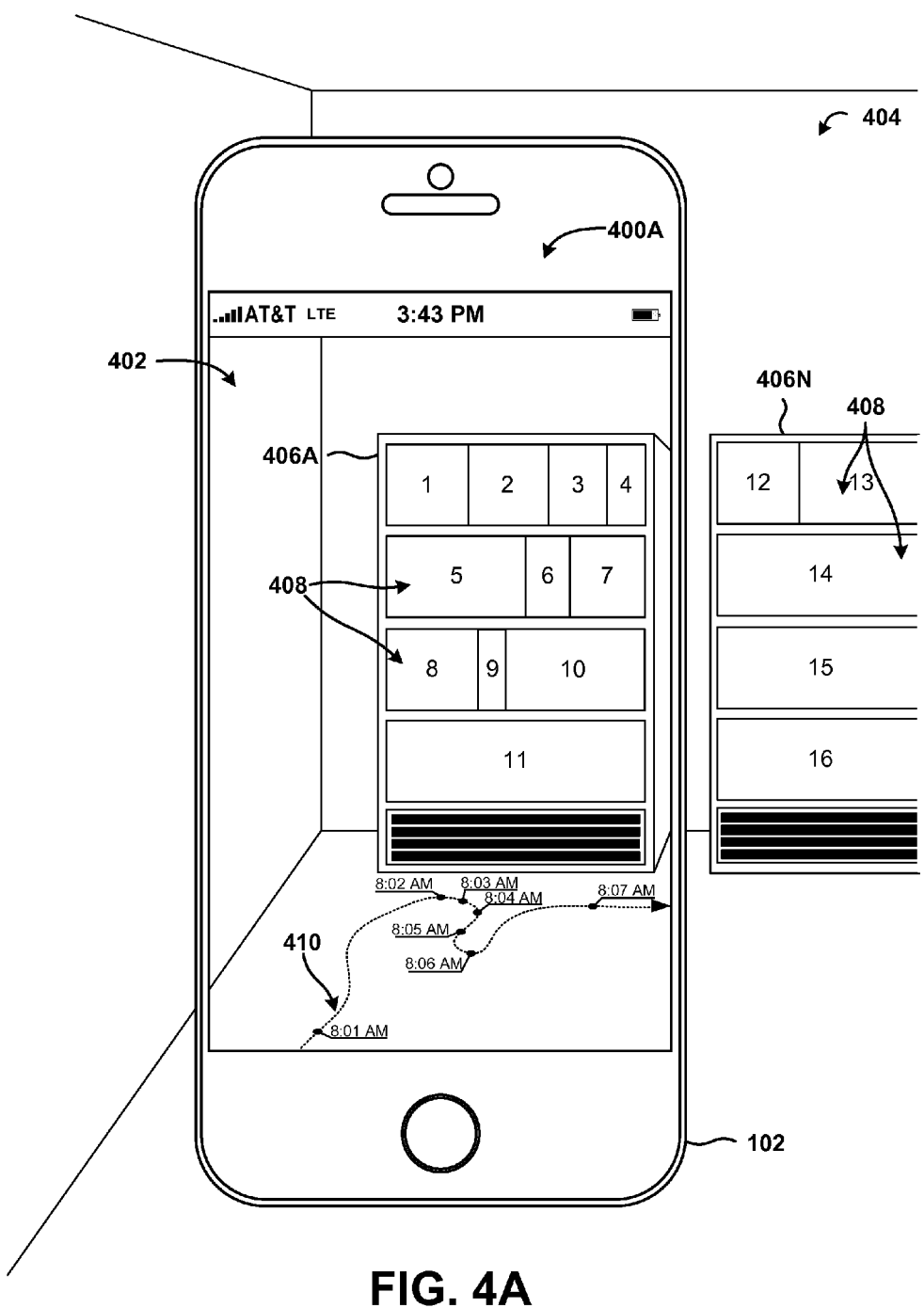
FIGS. 4A-4D are user interface diagrams showing various screen displays for providing virtual historical displays, according to some illustrative embodiments.

FIG. 4A shows an illustrative screen display 400A generated by a device such as the user device 102 and/or the calling device 122. According to various embodiments, the user device 102 and/or the calling device 122 can generate the screen display 400A and/or other screen displays in conjunction with execution of the virtual display application 108 and/or interactions with the virtual display service 110. It should be appreciated that the UI illustrated in FIG. 4A is illustrative of one contemplated example of the UIs and therefore should not be construed as being limited in any way.

The screen display 400A can include various menus and/or menu options (not shown in FIG. 4A). The screen display 400A also can include an augmented reality display 402. The augmented reality display 402 can be viewed and/or interacted with by a user or other entity to access and/or view the behavioral data 114 as an overlay for an image of a real environment 404. In the illustrated embodiment, the real environment 404 is illustrated as a retail location. It should be understood that this example is illustrative and therefore should not be construed as being limiting in any way.

In the illustrated embodiment, the real environment 404 is shown as including two or more shelving units 406A-N (hereinafter collectively and/or generically referred to as "shelving units 406"). Products and/or other items ("items") 408 are illustrated as being located on or at the shelving units 406. The items 408 can include, for example, grocery items, products or items such as computers, computer components, clothing, food items, books, periodicals, combinations thereof, or the like. It should be appreciated that the items 408 can include almost any type of items. Thus, the numbered items 408 shown in FIG. 4A should be understood as being merely illustrative of various items 408 that can be located at or near the shelving units 406 and/or other locations.

According to various embodiments, a user may wish to see behavioral data 114 associated with a location such as, for example, the real environment 404. Various types of input may be entered at or using a user device and/or other devices. In response to the input, a display can be generated, for example, at a user device 102 such as the user device 102 shown in FIGS. 1 and 4A, among others. The display can include the augmented reality display 402 to present the behavioral data 114 in a meaningful way.

As shown in FIG. 4A, the augmented reality display 402 includes a representation 410. The representation 410 can represent, in a graphical manner, the behavioral data 114 associated with a particular entity such as a user, an entity associated with the user such as a social networking connection or the like, and/or other entities. In the illustrated embodiment, the behavioral data 114 will be described as being associated with a person such as a social networking connection. It should be understood that this example is illustrative and therefore should not be construed as being limiting in any way.

As shown in the FIG. 4A, the representation 410 can include a path or trail associated with the social networking connection. The path or trail can illustrate a path or trail taken by the social networking connection when the social networking connection was at a location such as the real environment 404. It should be understood that the illustrated representation 410 is merely illustrative, as various other types of displays and/or representations 410 are contemplated and are possible.

In particular, various embodiments of the concepts and technologies described herein include presenting representations 410 such as holographic video presentations that depict, in an animation or video, movement of the social networking connection through or at the real environment 404. Other embodiments of the representation 410 can include map views of the real environment 404, flags or indicators that depict interactions by the social networking connection at or near the real environment 404, combinations thereof, or the like. In the embodiment shown in FIG. 4A, the representation 410 shows a path taken by the social networking connection as an overlay displayed within the augmented reality display 402. The representation 410 can include timestamps and approximate locations of the social networking connection at the real environment 404, though this is not necessarily the case. It should be understood that this example is illustrative and therefore should not be construed as being limiting in any way.

It can be appreciated that a user can view the augmented reality display 402 and/or the representation 410 to understand how the social networking connection moved at or near the real environment 404 and/or to understand interactions that occurred at the real environment 404. Additional embodiments of the representations 410 are illustrated and described below in more detail, particularly with reference to FIGS. 4B-4D.

Figure 4B:
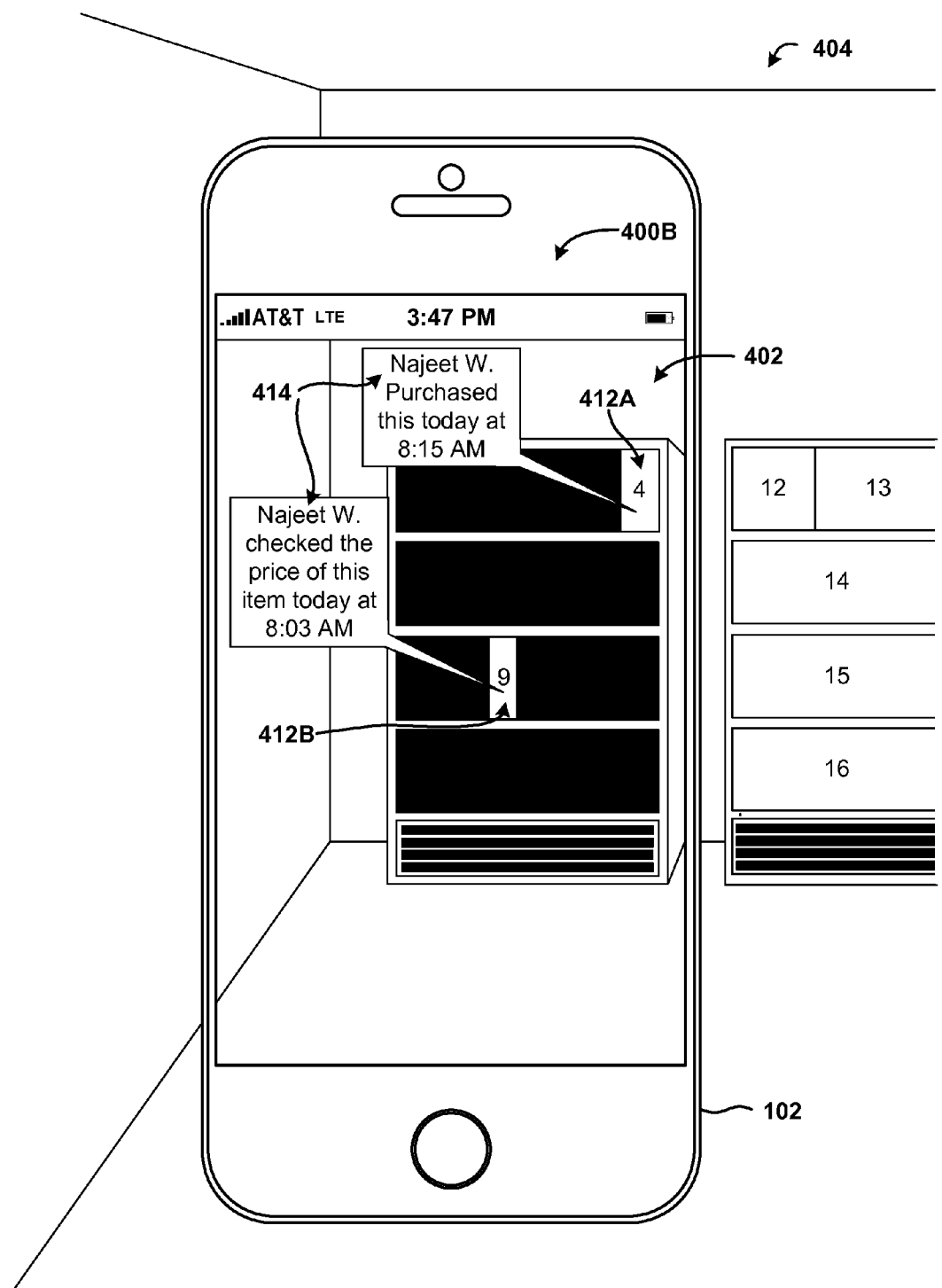

Referring now to FIG. 4B, additional aspects of the concepts and technologies disclosed herein for configuring and/or interacting with a virtual display service are described in detail. In particular, FIG. 4B shows an illustrative screen display 400B generated by a device such as the user device 102. It should be appreciated that the UI diagram illustrated in FIG. 4B is illustrative of one contemplated example of a UI and therefore should not be construed as being limited in any way. As shown in FIG. 4B, the screen display 400B can be presented on a mobile computing device such as a smartphone, if desired. It should be understood that this example is illustrative, and should not be construed as being limiting in any way.

The screen display 400B can be displayed by the user device 102, for example, in response to a command to display behavioral data 114 associated with a particular user and/or location such as, for example, the location 116, the real environment 404, combinations thereof, or the like. In the embodiment shown in FIG. 4B, the real environment 404 can be the same location as the real environment 404 shown in FIG. 4A, though a different screen display 400B may be presented on the user device 102. It can be appreciated from the description above that this embodiment is illustrative and therefore should not be construed as being limiting in any way.

In the screen display 400B shown in FIG. 4B, another augmented reality display 402 is illustrated with an alternative embodiment of the representation 410 illustrated and described above with reference to FIG. 4A. In the embodiment shown in FIG. 4B, the representation 410 is provided by modifying a view depicted in the augmented reality display 402. While there are various contemplated embodiments for modifying the augmented reality display 402, the illustrated embodiment shows blocking or suppressing visibility of the shelving units 406 and/or items 408. In the illustrated embodiment, the unblocked items 412A-B (hereinafter collectively and/or generically referred to as "unblocked items 412") are items that are relevant to the user viewing the augmented reality display 402. Items that are relevant or of interest to a user who is viewing the augmented reality display 402 are not blocked our or otherwise made less visible, while items that are not relevant to the user are blocked out, rendered less visible or invisible, or otherwise depicted in a manner that conveys to the user that these items are less relevant or irrelevant.

In some embodiments, the augmented reality display 402 is configured such that items looked at, purchased, and/or otherwise interacted with by a social networking connection of a user are considered to be relevant to the user and therefore are displayed to the user, while items not interacted with by the social networking connection of the user are considered to be irrelevant to the user and therefore are concealed from the user. It should be understood that these concepts can be extended, in some embodiments, to show or conceal products that do not have relevance to a particular user based upon set or known preferences or profiles (e.g., wheat flour may be concealed within the augmented reality display 402 based upon knowledge that the user is gluten free). It should be understood that these examples are illustrative and therefore should not be construed as being limiting in any way.

As shown in FIG. 4B, the screen display 400B also includes two indicators 414. The indicators 414 can provide information relating to the social networking connection or other entity with whom the behavioral data 114 is associated. In the illustrated embodiment, the indicators 414 indicate an identity of the social networking connection, times at which the social networking connection interacted with the unblocked items 412, and information describing the types of interactions that occurred between the social networking connection and the unblocked items 412.

In the illustrated example, the indicators 414 indicate that an entity, for example a social networking connection of a user viewing the screen display 400B, checked a price of a particular item at 8:03 AM and that the social networking connection purchased another item at 8:15 AM. It can be appreciated from the above description of FIGS. 1-3, that the behavioral data 114 can include movement information associated with the social networking connection within the real environment 404, search information associated with the social networking connection, purchase information associated with the social networking connection, combinations thereof, or the like. As such, the indicators 414 can include various types of information that may be of interest and/or relevant to the user viewing the screen display 400B. Because additional and/or alternative information may be presented by way of the screen display 400B, it should be understood that this example is illustrative and therefore should not be construed as being limiting in any way.

Figure 4C:
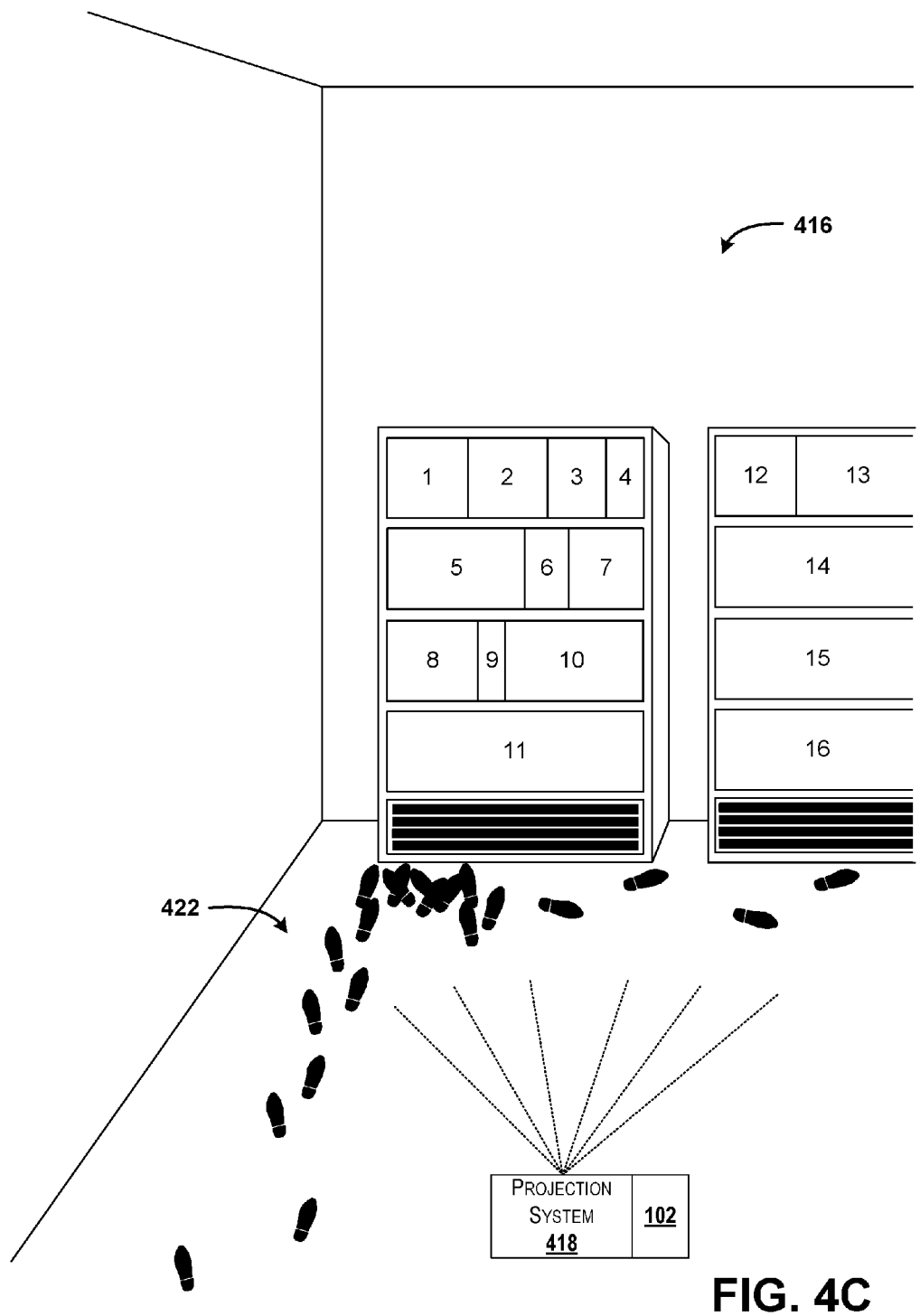

Turning now to FIG. 4C, additional aspects of the concepts and technologies disclosed herein for interacting with and/or providing functionality associated with a virtual display service are described in detail. In particular, FIG. 4C shows a projected augmented reality display 416 that may be generated by and/or presented using a device such as the user device 102 via execution and/or interaction with a virtual display application 108 and/or via interactions with a virtual display service 110. It should be appreciated that the embodiment of the projected augmented reality display 416 illustrated in FIG. 4C is illustrative of one contemplated example of the projected augmented reality display 416 that can be generated by the user device 102 and therefore should not be construed as being limited in any way.

As shown in FIG. 4C, the projected augmented reality display 416 can be generated by a mobile computing device such as the user device 102. According to various embodiments, the projected augmented reality display 416 can be projected by a projection system 418 that is included in the user device 102, connected to the user device 102, in communication with the user device 102, and/or located elsewhere and/or in communication with other devices, if desired. It should be understood that this example is illustrative, and should not be construed as being limiting in any way.

As shown in FIG. 4C, a user can view, using the projected augmented reality display 416, a path taken by a social networking connection or other entity in the real environment 404 and see the path in the real environment 404 without having to look at a display or other component of a user device 102 or other computing device. As such, it can be appreciated that some embodiments of the concepts and technologies described herein can enable generation and presentation of displays in a real environment 404 or other environment without using a display or the like. It should be understood that these examples are illustrative and therefore should not be construed as being limiting in any way.

Figure 4D:
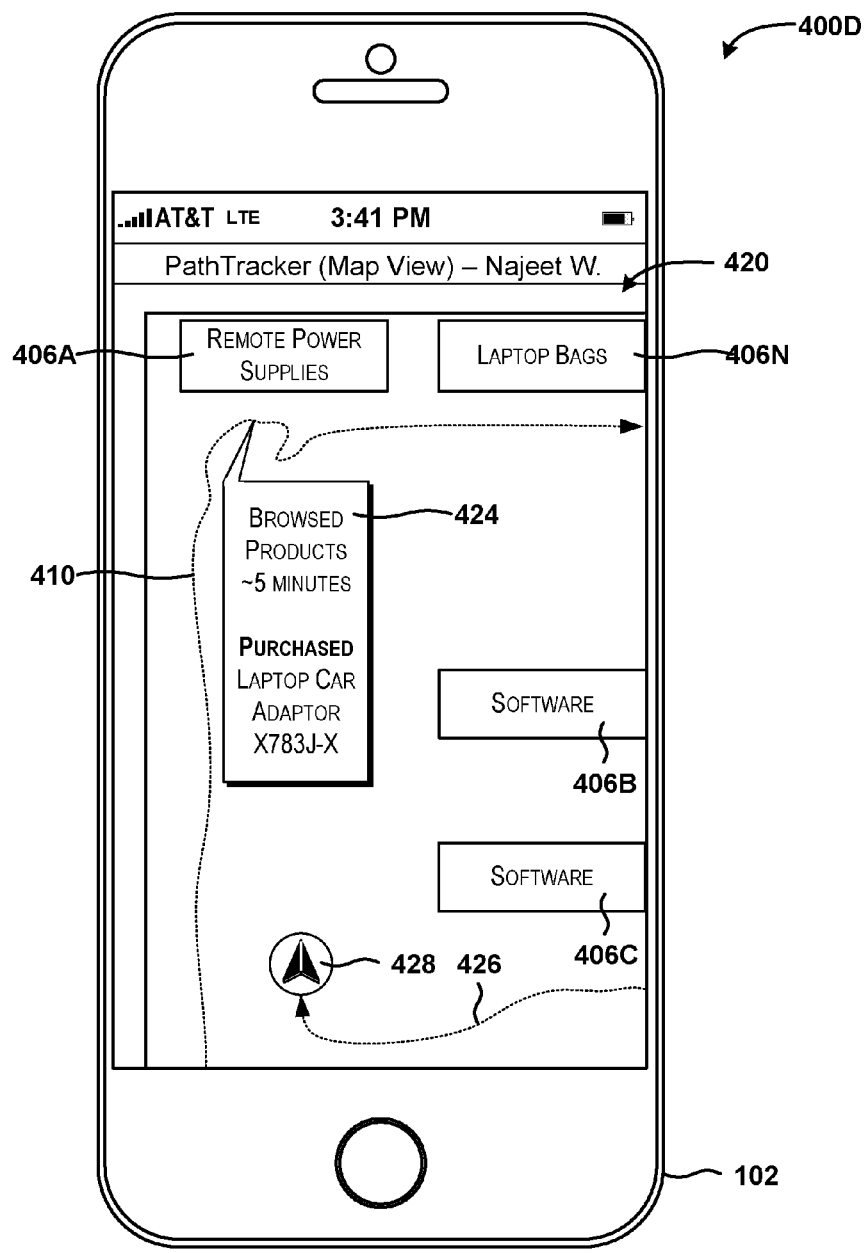

Turning now to FIG. 4D, additional aspects of the concepts and technologies disclosed herein for interacting with and/or providing functionality associated with a virtual display service are described in detail. In particular, FIG. 4D shows an illustrative screen display 400D generated by and/or presented at a device such as the user device 102 via execution and/or interaction with a virtual display application 108 and/or interactions with a virtual display service 110. It should be appreciated that the UI diagram illustrated in FIG. 4D is illustrative of one contemplated example of a UI that can be generated by the user device 102 and therefore should not be construed as being limiting in any way. As shown in FIG. 4D, the screen display 400D can be presented on a mobile computing device such as a smartphone, if desired. It should be understood that this example is illustrative, and should not be construed as being limiting in any way.

As shown in FIG. 4D, the screen display 400D can present a map view 420 that includes a representation 410 that represents the path 422 and/or interactions associated with a social networking connection of a user viewing the screen display 400D. In the illustrated embodiment, the map view 420 is displaying a map representation of the real environment 404 shown in FIGS. 4A-4C. Of course, this example is merely illustrative and therefore should not be construed as being limiting in any way.

Various embodiments of the map view 420 are contemplated and are possible. In the illustrated embodiment, the map view 420 includes the representation 410 as well as representations of walls, furniture, displays, or the like within environment depicted by the map view 420. It should be understood that the virtual display service 110 can communicate with various entities to obtain data used to generate the map view 420 such as a store or other establishment owner, who can provide information relating to the layout and/or features of a particular location. In one contemplated embodiment, a store owner provides a layout, or data depicting the layout such as a CAD model or the like, to the virtual display service 110. The virtual display service 110 can generate the map view 420 using the CAD model or the like and provide that to users of the virtual display service 110. It should be understood that this example is illustrative and therefore should not be construed as being limiting in any way.

The map view 420 also can include additional information or indicators ("indicators") 424. The indicators 424 can provide information relating to the path of the social networking connection within the environment depicted by the map view 420. The indicators 424 additionally or alternatively can provide information relating to interactions of the social networking connection with items within the location depicted within the map view 420. In the illustrated embodiment, the indicator 424 provides information relating to interactions of the social networking connection with products on the shelving unit 406A. In particular, the indicator 424 indicates that the social networking connection was located at or near the shelving unit 406A for about five minutes, and that the social networking connection purchased a product or item associated with the shelving unit 406A. It should be understood that this example is illustrative and therefore should not be construed as being limiting in any way.

The map view 420 also includes a representation 426 associated with a user or other entity such as a user of the user device 102. The representation 426 can indicate a path the user has taken within the location depicted by the map view 420. The map view 420 also can include a current location indicator 428 that depicts a current location of the user, if desired. Thus, the user or another entity can view the map view 420 and determine, based upon the map view 420, how a path and/or current location of the user relate to a path taken by social networking connection or other entity within the same environment. It should be understood that this example is illustrative and therefore should not be construed as being limiting in any way.

It can be appreciated that the map view 420, the representation 410, and/or the indicator 424 can be generated by the virtual display service 110 and/or the virtual display application 108. In various embodiments, the map view 420, the representation 410, and/or the indicator 424 can be generated based upon the behavioral data 114. Additionally, it should be understood that the representation 426 associated with a user or other entity can be generated by the virtual display application 108 and/or the virtual display service 110 based upon behavioral data 114. Because the illustrated screen display 400D can be generated in other ways and/or based upon other data and/or information, it should be understood that these examples are illustrative and therefore should not be construed as being limiting in any way.

Figure 5:
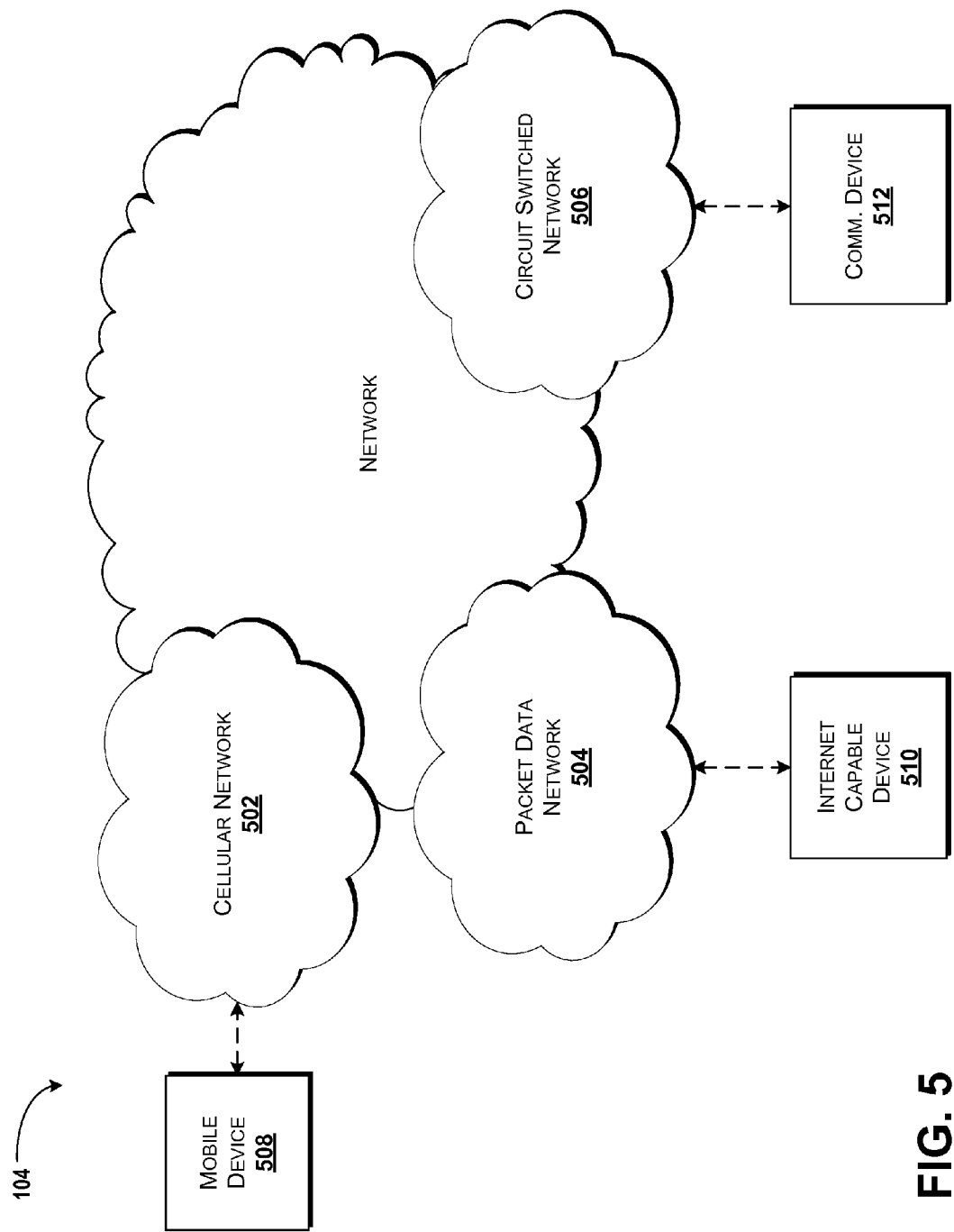
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G and 5G mobile communications standards, as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
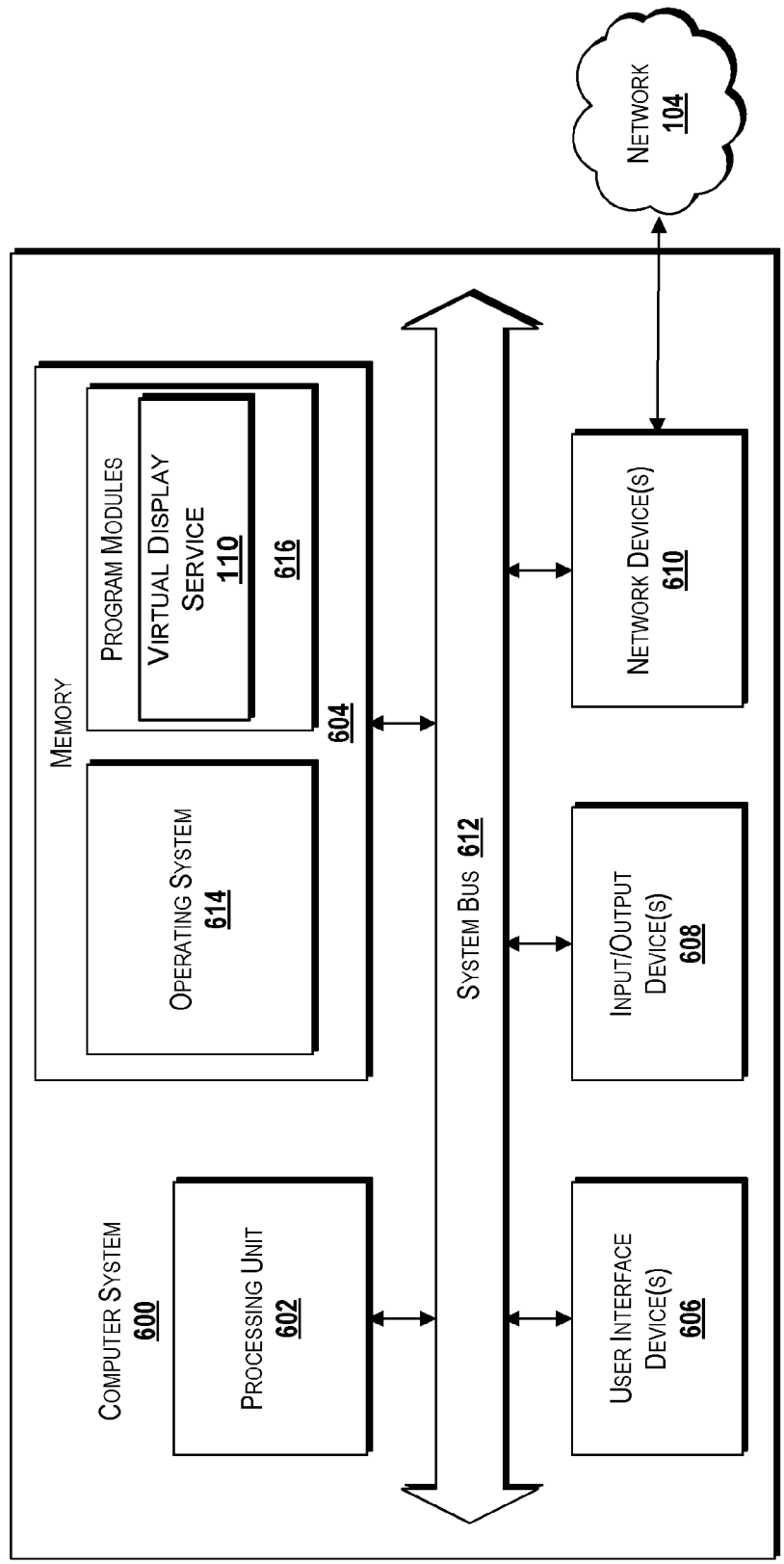
FIG. 6 is a block diagram illustrating an example computer system configured to obtain and generate data to provide virtual historical displays, according to some illustrative embodiments.

FIG. 6 is a block diagram illustrating a computer system 600 configured to provide the functionality described herein for generating and providing virtual historical displays 109, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the virtual display service 110. This and/or other programs can be embodied in computer-readable media containing instructions that, when executed by the processing unit 602, perform the method 200 described in detail above with respect to FIG. 2 and/or interact with a user device 102 to perform one or more of the operations of the method 300 illustrated in FIG. 3. According to embodiments, the program modules 616 may be embodied in hardware, software, firmware, or any combination thereof. Although not shown in FIG. 6, it should be understood that the memory 604 also can be configured to store the behavioral data 114 and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
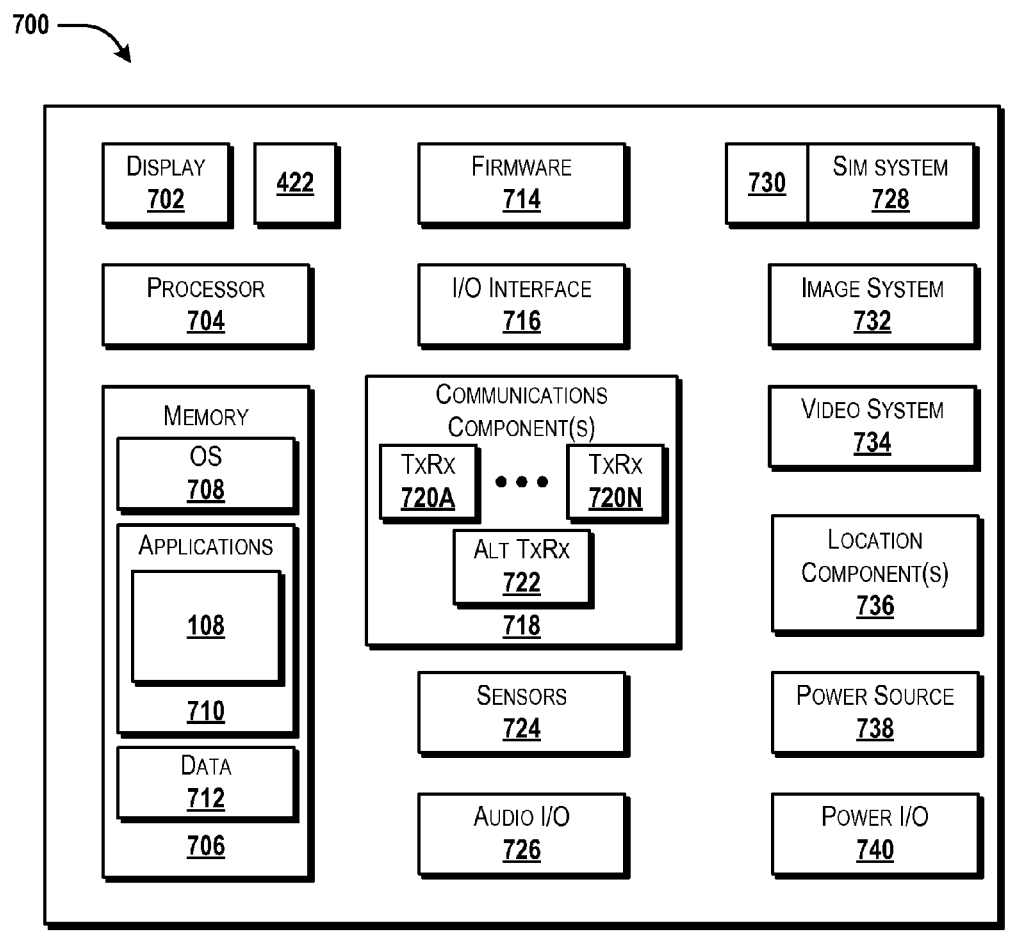
FIG. 7 is a block diagram illustrating an example mobile device configured to interact with a virtual display service, according to some illustrative embodiments.

Turning now to FIG. 7, an illustrative mobile device 700 and components thereof will be described. In some embodiments, the user device 102 and/or the calling device 122 described above with reference to FIGS. 1-6 can be configured as and/or can have an architecture similar or identical to the mobile device 700 described herein in FIG. 7. It should be understood, however, that the user device 102 and/or the calling device 122 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display maps, augmented reality displays, various graphical user interface elements, text, images, video, virtual keypads and/or keyboards, messaging data, notification messages, metadata, internet content, device status, time, date, calendar data, device preferences, map and location data, combinations thereof, and/or the like. In some embodiments, the mobile device 700 can include a projector or other display device such as the projection system 418 illustrated and described above with reference to FIG. 4C. Thus, in addition to displaying graphical user interface elements on a display local to the mobile device 700, the mobile device 700 can display graphical user interface elements on remote surfaces and/or structures such as a floor, wall, projection screen, or the like.

The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the virtual display application 108, other computer-executable instructions stored in a memory 706, or the like. In some embodiments, the applications 710 also can include a UI application (not illustrated in FIG. 7).

The UI application can interface with the operating system 708, for example the operating system 106 and/or the operating system 124 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the MS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to generate user interfaces for viewing behavioral data 114, to generated augmented reality displays and/or projected augmented reality displays, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, asset information, asset tags and/or asset identifiers, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, asset information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for generating and providing virtual historical displays have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   obtaining, at a processor executing a virtual display service, behavioral data that describes activity at a geographic location, wherein the behavioral data is associated with a user of a first device;
   associating, by the processor, the behavioral data with the first device and with the geographic location;
   detecting, by the processor, subsequent activity associated with a second device that is located at the geographic location;
   determining, by the processor, that the behavioral data is to be shared with the second device; and
   providing, by the processor, the behavioral data to the second device.

2. The method of claim 1, wherein determining that the behavioral data is to be shared comprises receiving, from the second device, a service call that requests the behavioral data.

3. The method of claim 2, wherein the service call comprises contextual information that relates to the subsequent activity, the contextual information comprising an identity of an entity associated with the second device and data that identifies the geographic location.

4. The method of claim 3, further comprising comparing, by the processor, the identity of the entity with related user data stored with the behavioral data to determine if the entity is related to the user, the related user data comprising social networking data.

5. The method of claim 1, further comprising generating, by the processor, virtual display data comprising a graphical user interface element based upon the behavioral data, wherein providing the behavioral data to the second device comprises providing the virtual display data to the second device.

6. The method of claim 1, wherein the second device executes a virtual display application that generates a virtual historical display based upon the behavioral data, the virtual historical display comprising an augmented reality display that represents the activity of the user at the geographic location.

7. The method of claim 1, wherein the second device comprises a projection system, wherein the second device executes a virtual display application that generates a virtual historical display based upon the behavioral data, and wherein the virtual historical display comprises a projected augmented reality display that represents the activity of the user at the geographic location.

8. The method of claim 1, wherein the second device executes a virtual display application that generates a virtual historical display based upon the behavioral data, the virtual historical display comprising an augmented reality display that represents the activity of the user at the geographic location by concealing items at the geographic location that are not relevant to the activity.

9. The method of claim 1, wherein the second device executes a virtual display application that generates a virtual historical display based upon the behavioral data, the virtual historical display comprising an indicator that shows an action and a time associated with the activity of the user at the geographic location.

10. The method of claim 1, wherein the second device executes a virtual display application that performs operations comprising:
generating a request for the behavioral data upon arriving at the geographic location;
receiving the behavioral data; and
presenting the behavioral data.

11. The method of claim 1, wherein the second device executes a virtual display application that generates an augmented reality display that conceals items at the geographic location that are not relevant to the activity.

12. A system comprising:
a processor; and
a memory that stores computer-executable instructions that, when executed by the processor, cause the processor to perform operations comprising
obtaining behavioral data that describes activity at a geographic location, wherein the behavioral data is associated with a user of a first device;
associating the behavioral data with the first device and with the geographic location;
detecting subsequent activity by a second device that is located at the geographic location;
determining that the behavioral data is to be shared with the second device; and
providing the behavioral data to the second device.

13. The system of claim 12, wherein determining that the behavioral data is to be shared with the second device comprises comparing a context of the subsequent activity to the behavioral data to determine if the behavioral data is to be shared with the second device.

14. The system of claim 12, wherein the second device executes a virtual display application that generates a virtual historical display based upon the behavioral data, the virtual historical display comprises one display selected from a group of displays comprising
an augmented reality display that represents the activity of the user at the geographic location;
a projected augmented reality display that represents the activity of the user at the geographic location by projecting graphical user interface elements at the geographic location using a projection system of the second device;
a further augmented reality display that represents the activity of the user at the geographic location by concealing items at the geographic location that are not relevant to the activity;
an indicator that shows an action and a time associated with the activity of the user at the geographic location; and
a map display that depicts the activity of the user at the geographic location.

15. The system of claim 12, wherein the behavioral data comprises:
user data that identifies the user;
activity data that describes the activity of the user at the geographic location;
location data that defines the geographic location; and
related user data that identifies a related entity that is related to the user based upon a social networking connection.

16. The system of claim 12, wherein the second device executes a virtual display application that generates an augmented reality display that conceals items at the geographic location that are not relevant to the activity.

17. A computer storage medium having computer-executable instructions stored thereon that, when executed by a processor, cause the processor to perform operations comprising:
obtaining behavioral data that describes activity at a geographic location, wherein the behavioral data is associated with a user of a first device;
associating the behavioral data with the first device and with the geographic location;
detecting subsequent activity by a second device that is located at the geographic location;
determining that the behavioral data is to be shared with the second device; and
providing the behavioral data to the second device.

18. The computer storage medium of claim 17, wherein the behavioral data comprises:
user data that identifies the user;
activity data that describes the activity of the user at the geographic location;
location data that defines the geographic location; and
related user data that identifies a related entity that is related to the user based upon a social networking connection.

19. The computer storage medium of claim 17, wherein the second device executes a virtual display application that generates an augmented reality display that conceals items at the geographic location that are not relevant to the activity.

* * * * *